United States Patent
Luo (10) Patent No.: US 11,513,615 B2
(45) Date of Patent: Nov. 29, 2022

(54) DIGITAL ELECTROMAGNETIC STYLUS, INPUT SYSTEM, AND METHOD FOR CONTROLLING SAME

(71) Applicant: Shenzhen Huion Animation Technology Co., Ltd., Shenzhen (CN)

(72) Inventor: Yong Luo, Shenzhen (CN)

(73) Assignee: SHENZHEN HUION ANIMATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/363,497

(22) Filed: Jun. 30, 2021

(65) Prior Publication Data

US 2021/0405778 A1    Dec. 30, 2021

(30) Foreign Application Priority Data

Jun. 30, 2020 (CN) ............ 202010625651.5

(51) Int. Cl.
*G06F 3/0354* (2013.01)
*G06F 3/038* (2013.01)
*G06F 3/046* (2006.01)

(52) U.S. Cl.
CPC ........ *G06F 3/03545* (2013.01); *G06F 3/0383* (2013.01); *G06F 3/046* (2013.01)

(58) Field of Classification Search
CPC .... G06F 3/03545; G06F 3/0383; G06F 3/046; G06F 2203/0384; G06F 3/04162; G06F 1/3259
See application file for complete search history.

(56) References Cited

U.S. PATENT DOCUMENTS

| | | | | | |
|---|---|---|---|---|---|
| 4,956,526 | A | * | 9/1990 | Murakami | G06F 3/046 178/18.08 |
| 5,600,105 | A | * | 2/1997 | Fukuzaki | G06F 3/03545 178/19.06 |
| 5,792,997 | A | * | 8/1998 | Fukuzaki | G06F 3/046 178/20.01 |
| 5,898,136 | A | * | 4/1999 | Katsurahira | G06F 3/046 345/173 |
| 6,020,849 | A | * | 2/2000 | Fukuzaki | G06F 3/046 345/158 |
| 7,149,647 | B2 | * | 12/2006 | Katsurahira | G06F 1/3237 702/150 |
| 7,868,873 | B2 | * | 1/2011 | Palay | G06F 3/03545 345/173 |
| 9,964,395 | B2 | * | 5/2018 | Yamada | G01N 17/00 |
| 10,296,113 | B2 | * | 5/2019 | Eguchi | G01L 1/142 |
| 10,503,281 | B2 | * | 12/2019 | Fujitsuka | G06F 3/0383 |

(Continued)

*Primary Examiner* — Benyam Ketema
(74) *Attorney, Agent, or Firm* — IPro, PLLC (57) ABSTRACT

The present disclosure discloses a digital electromagnetic stylus. The electromagnetic styluses include a system-on-chip unit, a transceiver unit, a first rectifier and filter unit, a second rectifier and filter unit, a pressure and key detection unit, and a transmission control unit. The system-on-chip unit, the transmission control unit, and the transceiver unit are connected in sequence. The first rectifier and filter unit and the second rectifier and filter unit are connected in parallel between the system-on-chip unit and the transceiver unit. The pressure and key detection unit is connected to the system-on-chip unit. The present discloses further provides an input system, and a method for controlling the same.

10 Claims, 8 Drawing Sheets

(56) References Cited

U.S. PATENT DOCUMENTS

| | | | |
|---|---|---|---|
| 11,079,863 B2* | 8/2021 | Hara | G01L 5/161 |
| 2011/0214923 A1* | 9/2011 | Chen | G06F 3/041 |
| | | | 178/18.01 |
| 2012/0105361 A1* | 5/2012 | Kremin | G06F 3/04162 |
| | | | 345/174 |
| 2013/0082936 A1* | 4/2013 | Islamkulov | H01L 27/14609 |
| | | | 250/208.2 |
| 2015/0091859 A1* | 4/2015 | Rosenberg | G06F 3/03545 |
| | | | 345/174 |
| 2017/0083119 A1* | 3/2017 | Jensen | G06F 3/0383 |
| 2017/0086925 A1* | 3/2017 | Hacker | G01L 1/162 |
| 2017/0097695 A1* | 4/2017 | Ribeiro | G06F 3/03545 |
| 2018/0329526 A1* | 11/2018 | Peretz | G06F 3/03545 |
| 2021/0117014 A1* | 4/2021 | Hara | G06F 3/0441 |

* cited by examiner

DIGITAL ELECTROMAGNETIC STYLUS, INPUT SYSTEM, AND METHOD FOR CONTROLLING SAME

FIELD OF THE PRESENT DISCLOSURE

The present disclosure relates to electromagnetic styluses, and in particular to a digital electromagnetic stylus, an input system, and a method for controlling the same.

DESCRIPTION OF RELATED ART

Handwriting electromagnetic styluses have long been known as input devices in replace of human fingers in graphics tablets, graphics screens, signature tablets, handwriting tablets, handwriting notebooks, or mobile phones. The conventional handwriting electromagnetic styluses are categorized into active styluses and passive styluses. The active stylus is power-supplied by a battery, and the passive stylus acquires power by induction from an electromagnetic tablet. The passive electromagnetic styluses have become mainstream products. The passive electromagnetic styluses are further categorized into is analog styluses and digital styluses. In the analog stylus, key and pressure signals are transferred to a digitizer tablet by changing frequencies or phases, for example, as disclosed in the U.S. Pat. No. 5,600,105. Therefore, a larger frequency bandwidth is required to cover the frequency conversion range, and stability of the pressure and the coordinates is easily affected by unexpected frequencies (noise). In the digital stylus, the key and pressure signals are transferred to the digitizer tablet in a fixed-frequency modulation mode, for example, as disclosed in the U.S. Pat. Nos. 5,969,296 and 5,977,959. Therefore, a longer power supply time and counting are required to obtain higher pressure order, and the consumption of the power is larger.

In order to satisfy the use texture, manufacturers often raise the pressure order as much as possible, and the transmission rate of the signals is inevitably affected once the pressure order is raised. For example, in the U.S. Pat. No. 5,977,959, the transmission and reception time (about 200 μs) of one bit needs to be additionally consumed for each doubling of the pressure. For example, for 1023-order of pressure, about 2000 μs is required for 10 bits. In addition, Taiwan Patent No. TW451155 has disclosed a digitizer coordinate input system, in which electromagnetic waves with a fixed frequency transmitted from a digitizer tablet end are converted into pressure signals by a pressure sensor at an electromagnetic stylus end. For example, 1024×⅟₅₀₀ KHz=2048 μs is required to obtain 1024-order of pressure by using a 500 KHz transmission frequency, and 8192×⅟₅₀₀ KHz=16384 μs is required to obtain a higher order of pressure, for example, 8192-order of pressure.

Therefore, it is desired to provide an innovative digital electromagnetic stylus to address the above problem.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

FIG. 7 is a schematic diagram of signal transmission when the digital electromagnetic stylus is in contact with the digitizer tablet and the key switch is ON.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
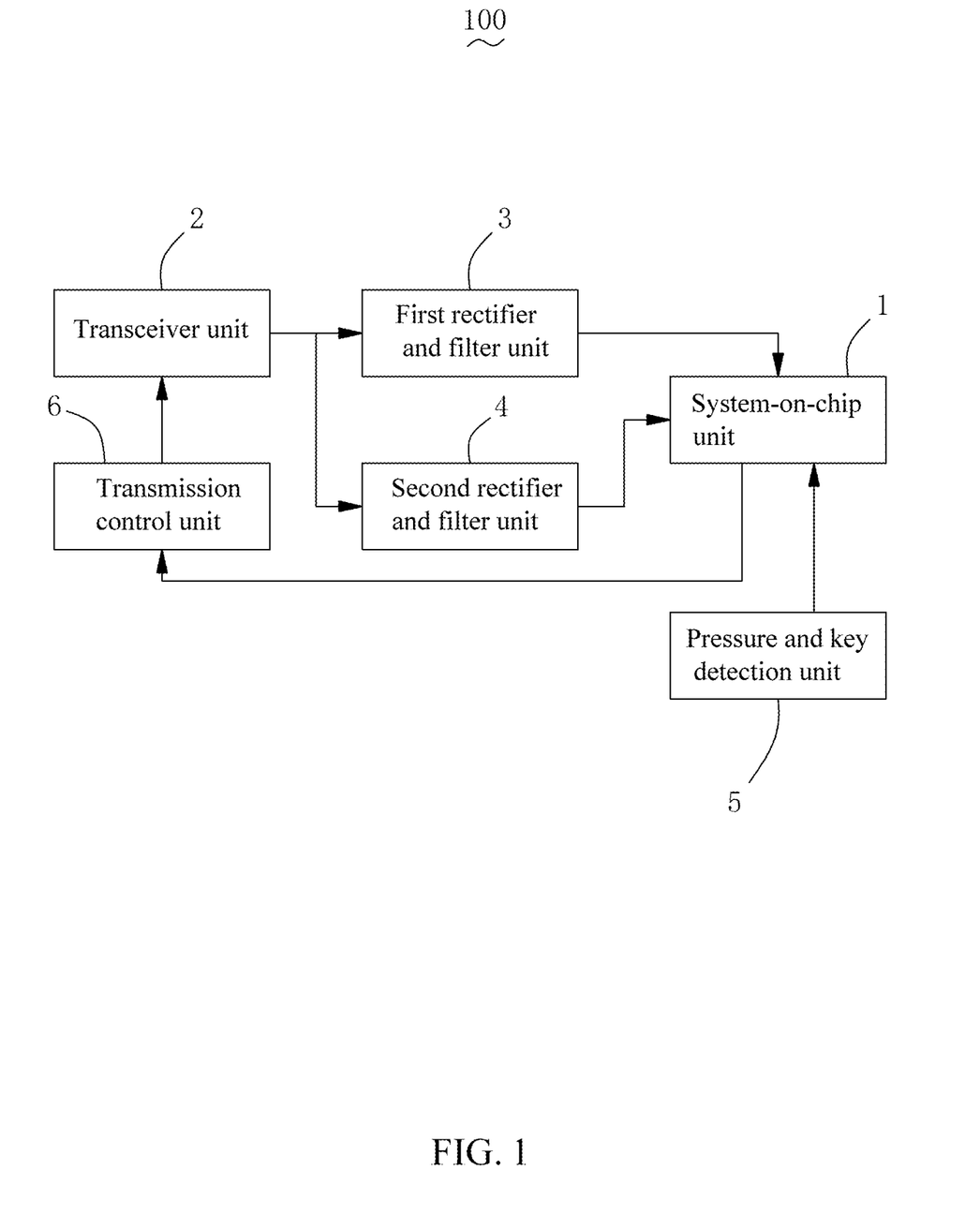
FIG. 1 is a schematic structural diagram of a digital electromagnetic stylus according to the present disclosure.

Referring to FIG. 1, a schematic structural diagram of a digital electromagnetic stylus according to the present disclosure is illustrated. The electromagnetic stylus 100 according to the present disclosure includes a system-on-chip unit 1, a transceiver unit 2, a first rectifier and filter unit 3, a second rectifier and filter unit 4, a pressure and key detection unit 5, and a transmission control unit 6. The system-on-chip unit 1, the transmission control unit 6, and the transceiver unit 2 are connected in sequence. The first rectifier and filter unit 3 and the second rectifier and filter unit 4 are connected in parallel between the system-on-chip unit 1 and the transceiver unit 2. The pressure and key detection unit 5 is connected to the system-on-chip unit 1.

The transceiver unit 2 is configured to receive an electromagnetic signal transmitted by a digitizer tablet, and convert the electromagnetic signal into a corresponding electrical signal and output the electrical signal to the first rectifier and filter unit 3 and the second rectifier and filter unit 4; and generate a resonance in response to a frequency of the electromagnetic signal approaching a resonance frequency thereof, and transmit a resonance signal to the digitizer tablet, such that the digitizer tablet acquires touch information of the electromagnetic stylus.

The first rectifier and filter unit 3 is configured to shape and filter the electrical signal output by the transceiver unit 2, and output the shaped and filtered electrical signal to the system-on-chip unit 1 to supply power to the system-on-chip unit 1.

The second rectifier and filter unit 4 is configured to shape and filter the electrical signal output by the transceiver unit 2, and output the shaped and filtered electrical signal to the system-on-chip unit 1 to wake up the system-on-chip unit 1.

The pressure and key detection unit 5 is configured to detect stylus tip pressure data and a key state of the digital electromagnetic stylus.

The system-on-chip unit 1 is configured to control, based on a detection result of the pressure and key detection unit 5, a time length within which the transmission control unit 6 is disabled, and hence control an energy intensity of the resonance signal transmitted by the transceiver unit 2 to the digitizer tablet.

Specifically, the system-on-chip unit 1 includes an ADC converter, a comparator, a time counter, and a controller; wherein in response to the system-on-chip unit receiving the power and being initialized to enter deep sleep, the comparator is configured to generate a comparison output by comparing a voltage output by the second rectifier and filter unit 4 with a predetermined comparison voltage, and generate an interrupt signal on a rising edge of the comparison output, wherein the interrupt signal wakes up the system-on-chip unit 1 and the time counter is reset to zero; the ADC converter is configured to read the stylus tip pressure data and the key state detected by the pressure and key detection unit 5; the controller is configured to control, based on the stylus tip pressure data and the key state, the time length within which the transmission control unit 6 is disabled, and hence control the energy intensity of the resonance signal transmitted by the transceiver unit 2 to the digitizer tablet. The comparison voltage of the comparator is determined by an interval voltage of the system-on-chip unit 1, and the magnitude of the voltage is controllable.

Figure 2:
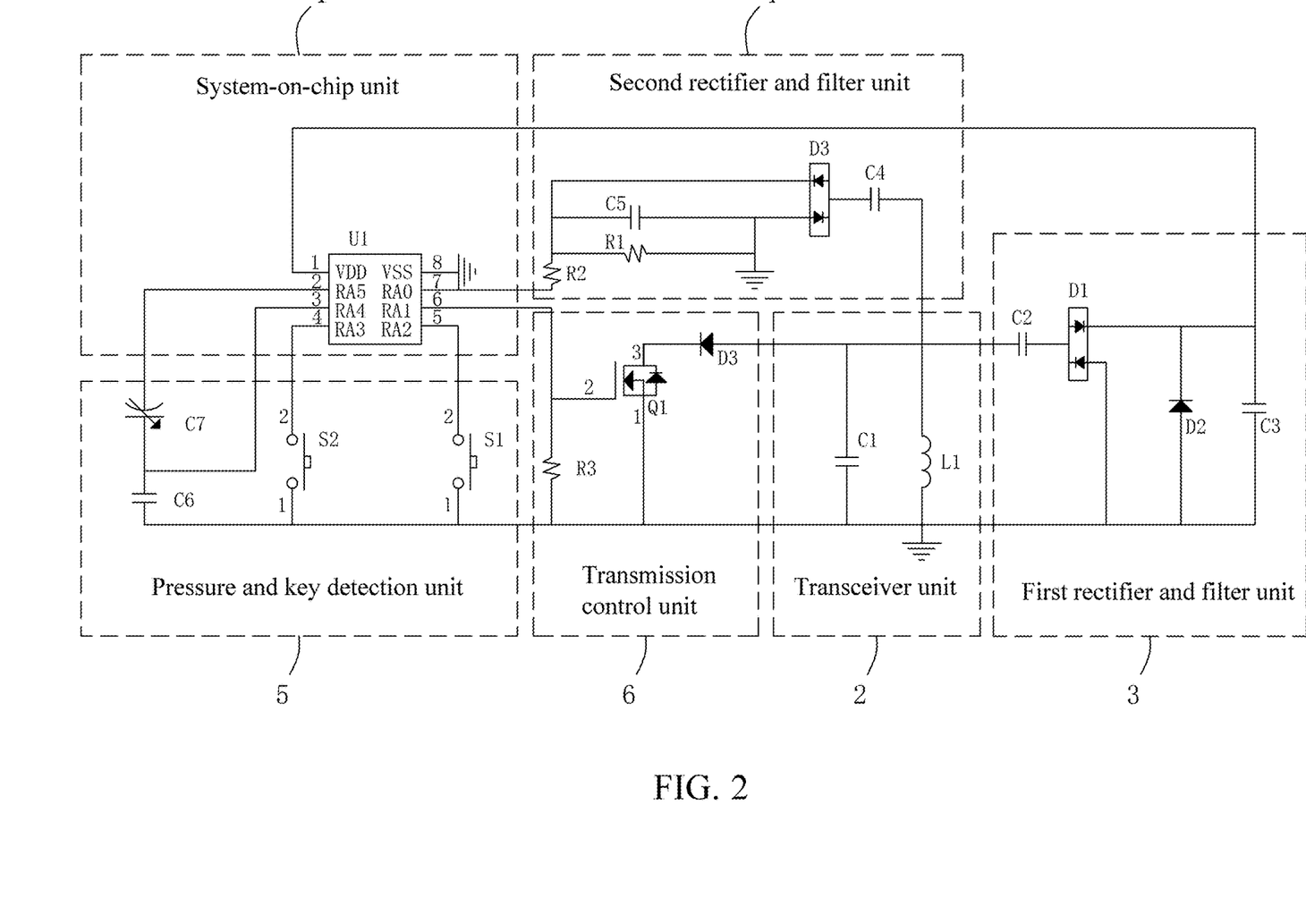
FIG. 2 is a circuit principle diagram of the digital electromagnetic stylus as illustrated in FIG. 1.

Referring to FIG. 2, the transceiver unit 2 includes a an inductor L1 and a capacitor C1 that are connected in parallel, wherein one terminals of the inductor L1 and the capacitor C1 are connected to the ground. The transceiver unit 2 has an operating frequency of $F=1/(2*\pi\sqrt{L1*C1})$.

The first rectifier and filter unit 3 includes a capacitor C2, two diodes D1, a diode D2, and a capacitor C3. One terminal of the capacitor C2 is connected to a non-grounding terminal of the inductor L1. An anode of one of the two diodes D1 is connected to the other terminal of the capacitor C2, and a cathode of the diode D1 is connected to an input terminal of the system-on-chip unit. A cathode of the other of two diodes D1 is connected to the other terminal of the capacitor C2, and an anode of the diode D1 is connected to the grounding terminals of the capacitor C1 and the inductor L1. The diode D2 and the capacitor C3 are connected in parallel between the grounding terminals of the capacitor C1 and the inductor L1 and the input terminal of the system-on-chip unit, and an anode of the diode D2 is connected to the grounding terminal of the inductor L1, and a cathode of the diode is connected to the input terminal of the system-on-chip unit.

The second rectifier and filter unit 4 includes a capacitor C4, two diodes D3, a capacitor C5, a resistor R1, and a resistor R2. One terminal of the capacitor C4 is connected to the non-grounding terminals of the inductor L1 and the capacitor C1. An anode of one of the two diodes D3 is connected to the other terminal of the capacitor C4, and a cathode of the diode D3 is connected to the input terminal of the system-on-chip unit. A cathode of the other of the two diodes D3 is connected to the other terminal of the capacitor C4, and an anode of the diode D3 is connected to the ground. The capacitor C5 and the resistor R1 are connected in parallel between the anode of the grounded diode D3 and the system-on-chip unit. The capacitor C5, the resistor R1, and a cathode of the diode D3 are connected to the input terminal of the system-on-chip unit via the resistor R2.

The pressure and key detection unit 5 includes a fixed capacitor C6 and a pressure sensitive capacitor C7 that are connected in series between the system-on-chip unit 1 and the transmission control unit 6, and a first switch S1 and a second switch S2 that are connected in parallel between the system-on-chip unit 1 and the transmission control unit 6. A connection point between the fixed capacitor C6 and the pressure sensitive capacitor C7 is connected to the system-on-chip unit via a conductive wire.

The transmission control unit 6 includes a field-effect transistor Q1, a diode D4, and a resistor R3. A source of the field-effect transistor Q1 is connected to an input terminal of the pressure and key detection unit, and the grounding terminals of the capacitor C1 and the inductor L1 respectively, a drain of the field-effect transistor Q1 is connected to a cathode of the diode D4, and a gate of the field-effect transistor Q1 is connected to the system-on-chip unit, and is connected to the source of the field-effect transistor Q1 and the input terminal of the pressure and key detection unit via the resistor R3. An anode of the diode D4 is connected to the non-grounding terminals of the capacitor C1 and the inductor L1.

The present disclosure further provides an input system. The input system includes the digital electromagnetic stylus 100 as described above and a digitizer tablet. The digitizer tablet is a conventional structure, and the specific structure thereof is not limited in the present disclosure. The structure of the digital electromagnetic stylus 100 is as described above, which is not described herein any further. The digitizer tablet acquires touch information of the digital electromagnetic stylus 100 based on the transmitted resonance signal.

Figure 3:
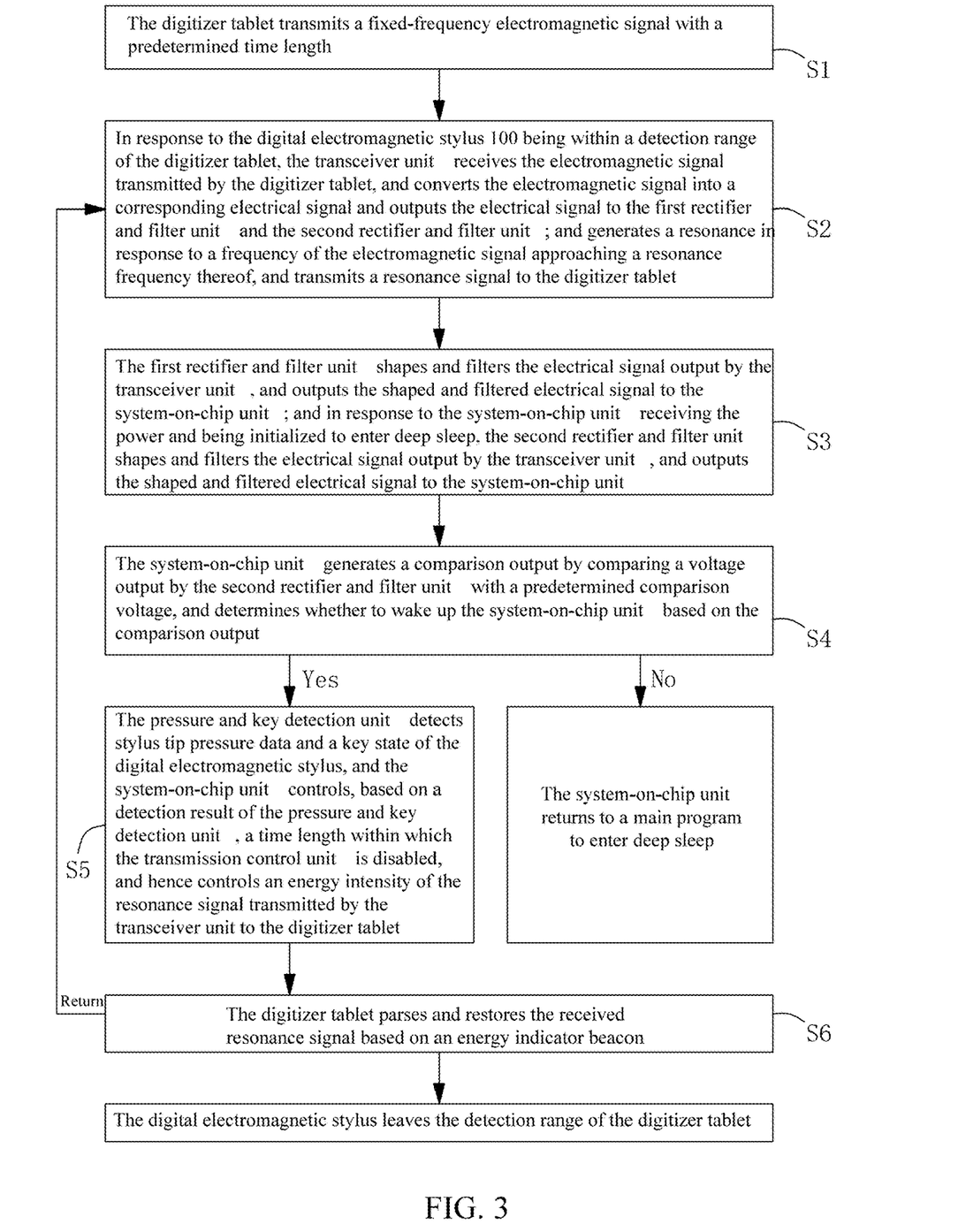
FIG. 3 is a schematic flowchart of a method for controlling an input system according to the present disclosure.

Referring to FIG. 3, the present disclosure further provides a method for controlling the input system. The method includes the following steps:

In Step01, the digitizer tablet transmits a fixed-frequency electromagnetic signal with a predetermined time length.

In Step02, in response to the digital electromagnetic stylus 100 being within a detection range of the digitizer tablet, the transceiver unit 2 receives the electromagnetic signal transmitted by the digitizer tablet, and converts the electromagnetic signal into a corresponding electrical signal and outputs the electrical signal to the first rectifier and filter unit 3 and the second rectifier and filter unit 4; and generates a resonance in response to a frequency of the electromagnetic signal approaching a resonance frequency thereof, and transmits a resonance signal to the digitizer tablet.

In Step03, the first rectifier and filter unit 3 shapes and filters the electrical signal output by the transceiver unit 2, and outputs the shaped and filtered electrical signal to the system-on-chip unit 1; and in response to the system-on-chip unit 1 receiving the power and being initialized to enter deep sleep, the second rectifier and filter unit 4 shapes and filters the electrical signal output by the transceiver unit 2, and outputs the shaped and filtered electrical signal to the system-on-chip unit 1;

In Step04, the system-on-chip unit 1 generates a comparison output by comparing a voltage output by the second rectifier and filter unit 4 with a predetermined comparison voltage, and determines whether to wake up the system-on-chip unit 1 based on the comparison output; wherein in response to the system-on-chip unit 1 being waken up, Step05 is performed, and otherwise, the system-on-chip unit 1 returns to a main program to enter deep sleep.

Figure 4:
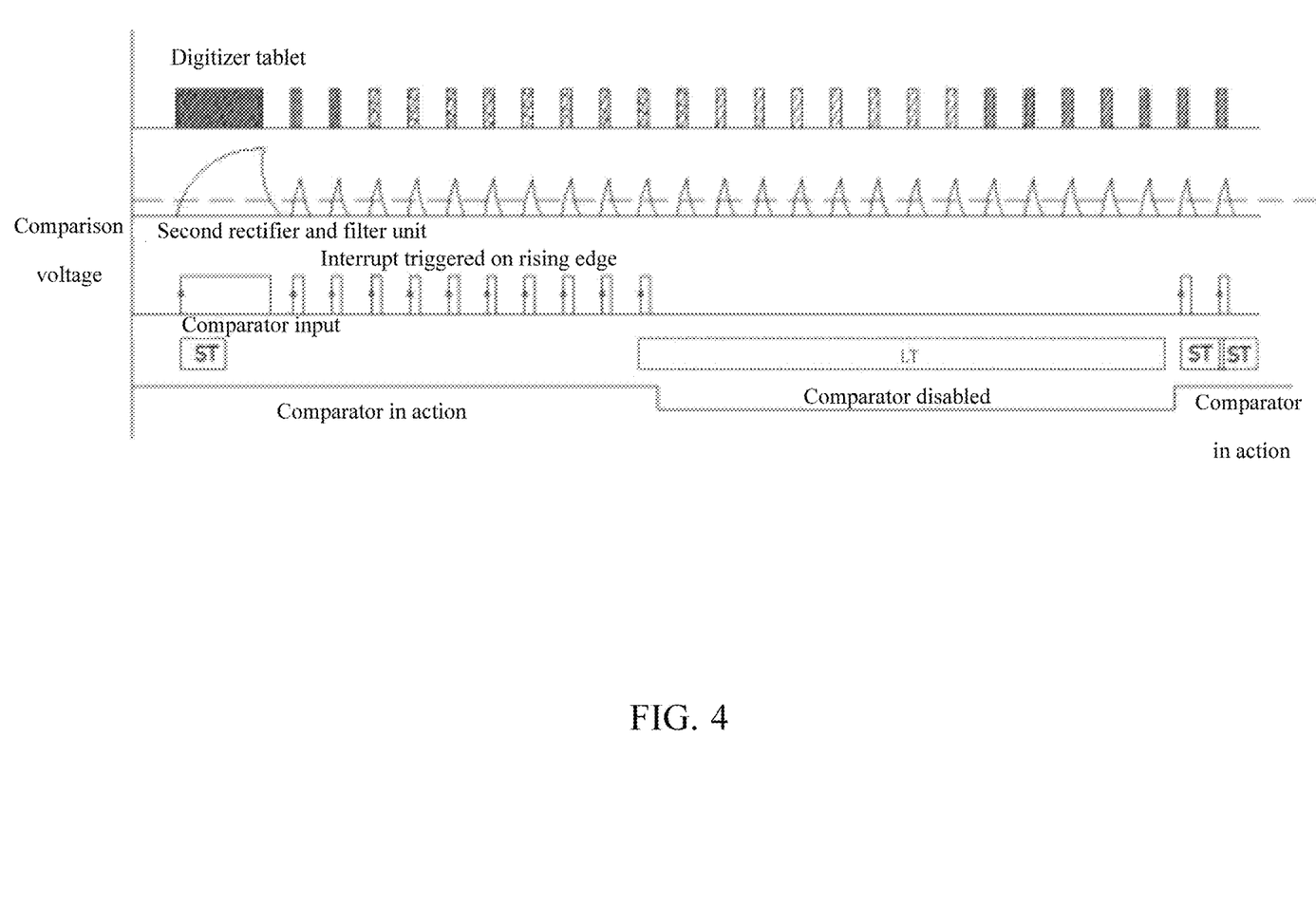
FIG. 4 is a schematic diagram of signal transmission between the digital electromagnetic stylus and a digitizer tablet.

Specifically, the system-on-chip unit 1 includes an ADC converter, a comparator, a time counter, and a controller (MCU); wherein when the system-on-chip unit 1 is initialized to enter deep sleep, the time counter starts timing; and the comparator generates the comparison output by comparing the voltage output by the second rectifier and filter unit 4 with the predetermined comparison voltage, and generates an interrupt signal on a rising edge of the comparison output. As illustrated in FIG. 4, if an interrupt signal is generated within a predetermined time period, the interrupt signal wakes up the ADC converter and the controller, and meanwhile the time counter is reset to zero, the ADC converter reads the stylus tip pressure data and the key state detected by the pressure and key detection unit 5, and the controller controls, based on the stylus tip pressure data and the key state, a time length within which the transmission control unit 6 is disabled, and hence controls an energy intensity of the resonance signal transmitted by the transceiver unit 2 to the digitizer tablet. Each time an interrupt signal is generated on the rising edge, the time counter is reset to zero, and short-time counting (ST) is started for the signals (synchronization/beacon) transmitted by the digitizer tablet. During the short-time counting, if no interrupt signal is received, the time counter overflows and generates an interrupt. If in this case the comparator is disabled, the time counter is reset to zero and the comparator is enabled again and returns to the main program to enter deep sleep. If the comparator is enabled, signal synchronization, pressure signal capture and key condition check of the stylus are performed to prepare the data, and then the comparator returns to the main program to enter deep sleep. Upon n interrupts on the rising edge, long-time counting (LT) is started and the comparator is disabled. In response to generating an interrupt during the long-time counting, the comparator is enabled again and returns to the main program to enter deep sleep. In response to generating an interrupt on the rising edge, the short-time counting (ST) is enabled again. The above steps are repeated, until the electromagnetic stylus leaves the detection range of the digitizer tablet.

In Step05, the pressure and key detection unit 5 detects stylus tip pressure data and a key state of the digital electromagnetic stylus, and the system-on-chip unit 1 controls, based on a detection result of the pressure and key detection unit 5, a time length within which the transmission control unit 6 is disabled, and hence controls an energy intensity of the resonance signal transmitted by the transceiver unit to the digitizer tablet.

Figure 5:
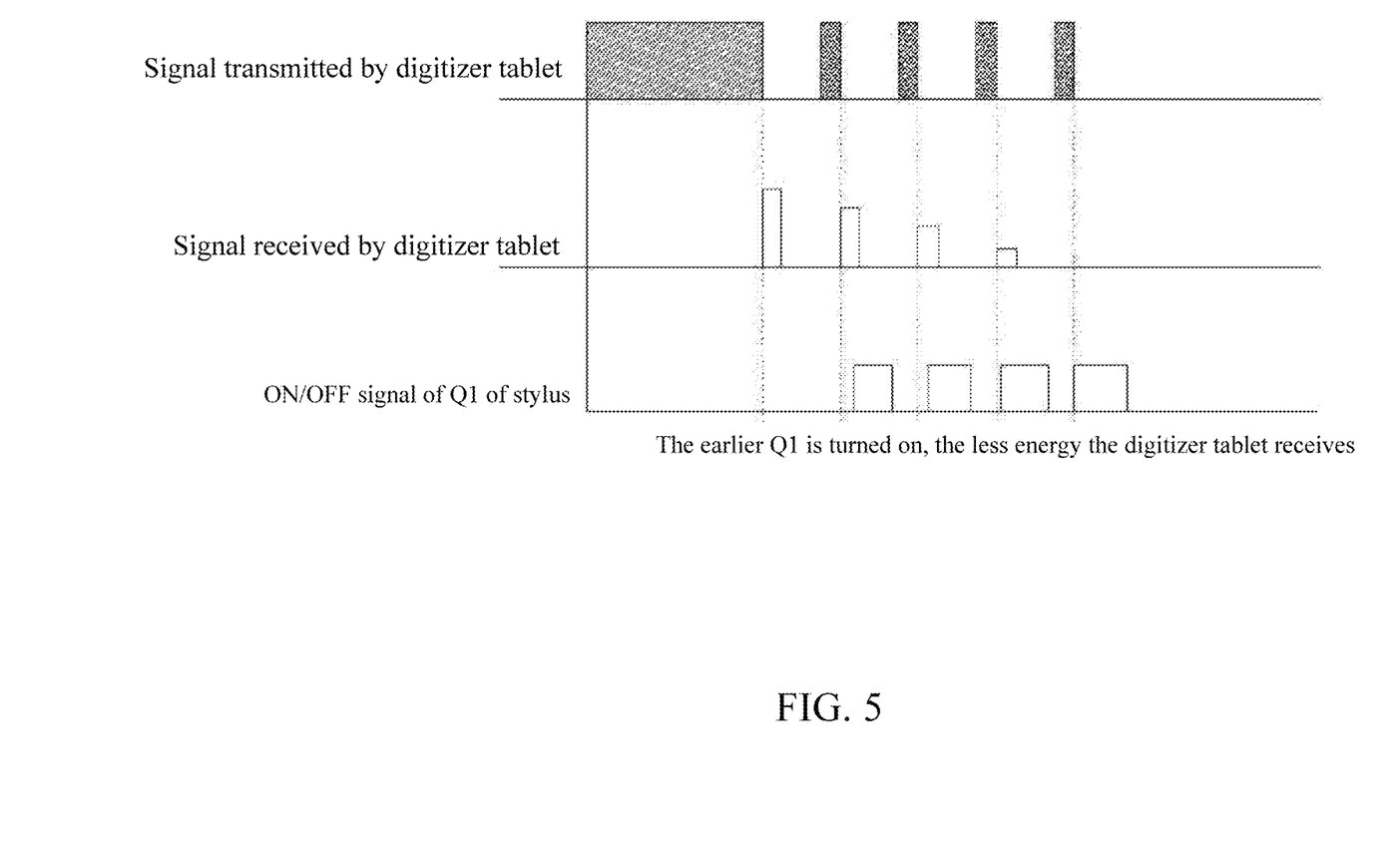
FIG. 5 is a schematic diagram of energy intensity of a resonance signal between the digital electromagnetic stylus and the digitizer tablet.

Referring to FIG. 5, a schematic diagram of energy intensity of a resonance signal between the digital electromagnetic stylus and the digitizer tablet is illustrated. The field-effect transistor Q1 of the transmission control unit 6 is substantially a switch device. A time length within which the field-effect transistor Q1 is in OFF state directly affects the magnitude of energy received by the digitizer tablet. The earlier the field-effect transistor Q1 is turned on, the less energy that the digitizer tablet receives.

Figure 6:
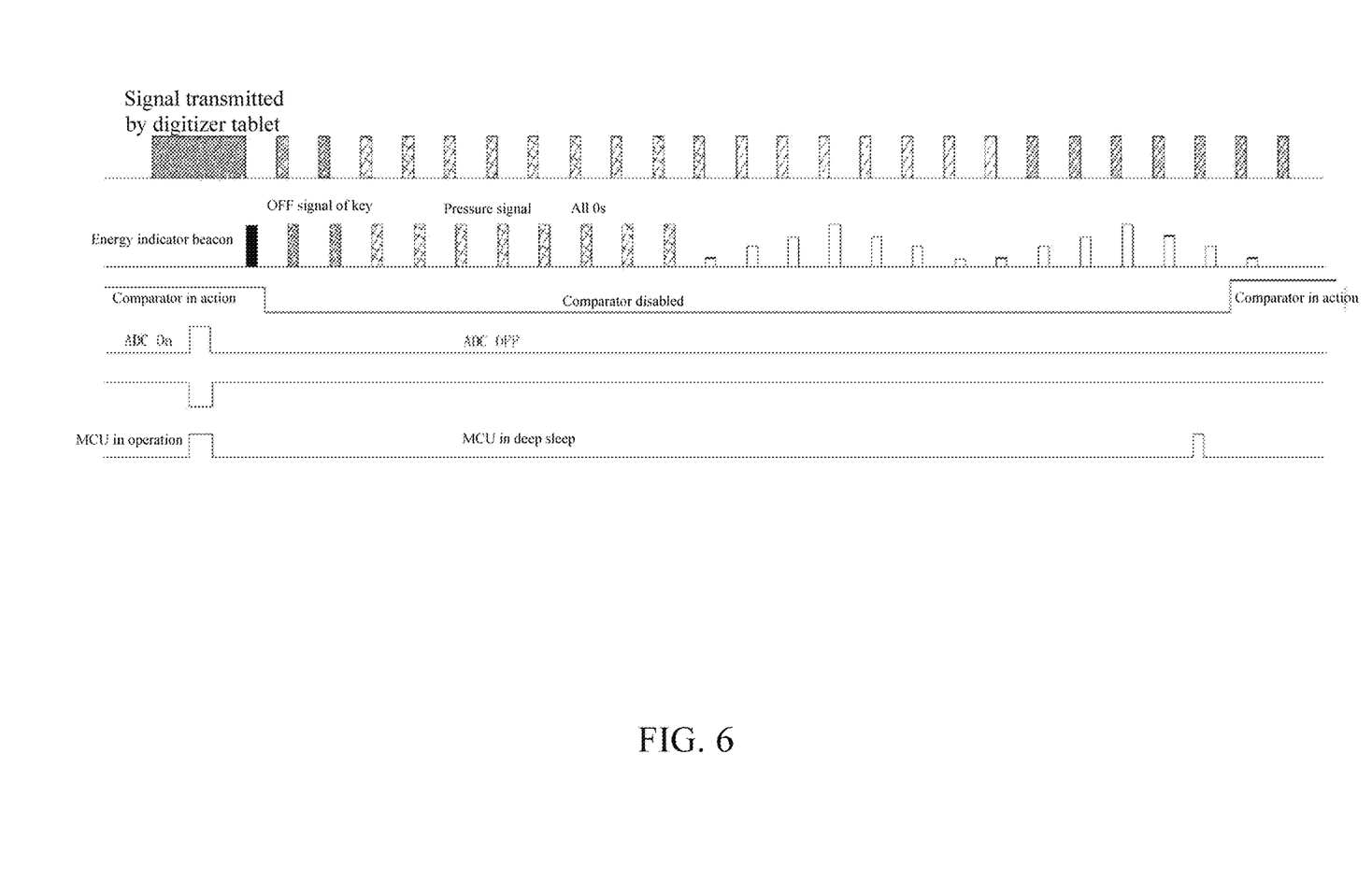
FIG. 6 is a schematic diagram of signal transmission when the digital electromagnetic stylus is suspended and a key switch is OFF.

In this step, controlling, by the system-on-chip unit 1 based on the detection result of the pressure and key detection unit, the time length within which the transmission control unit 6 is disabled includes:

in response to a key switch not being pressed down and the stylus tip suffering no pressure, disabling the transmission control unit, that is, turning off the field-effect transistor Q1 within this time period, and turning off the field-effect transistor Q1 within other time periods; wherein referring to FIG. 6, a schematic diagram of signal transmission when the digital electromagnetic stylus is suspended and the key switch is OFF is illustrated; and in this case, since the electromagnetic stylus is far from the detection range of the digitizer tablet and receives the weakest power, the system-on-chip unit 1 is in a sleep state except reading the stylus tip pressure data and the key state, and synchronizing signals, thereby saving power; and in response to detecting that the key switch is pressed down, enabling the transmission control unit; in response to detecting that a pressure value is 0, disabling the transmission control unit within a time period where the pressure value is 0; and in response to detecting that the pressure value is not 0, disabling or enabling the transmission control unit based on the pressure value within a time period where the pressure value is not 0, and controlling an enable time length according to a predetermined energy code.

As such, the field-effect transistor Q1 is switched between turn-on and turn-off, such that the time length within which the transmission control unit 6 is disabled, and hence the magnitude of energy received by the digitizer tablet is controlled.

Figure 7:
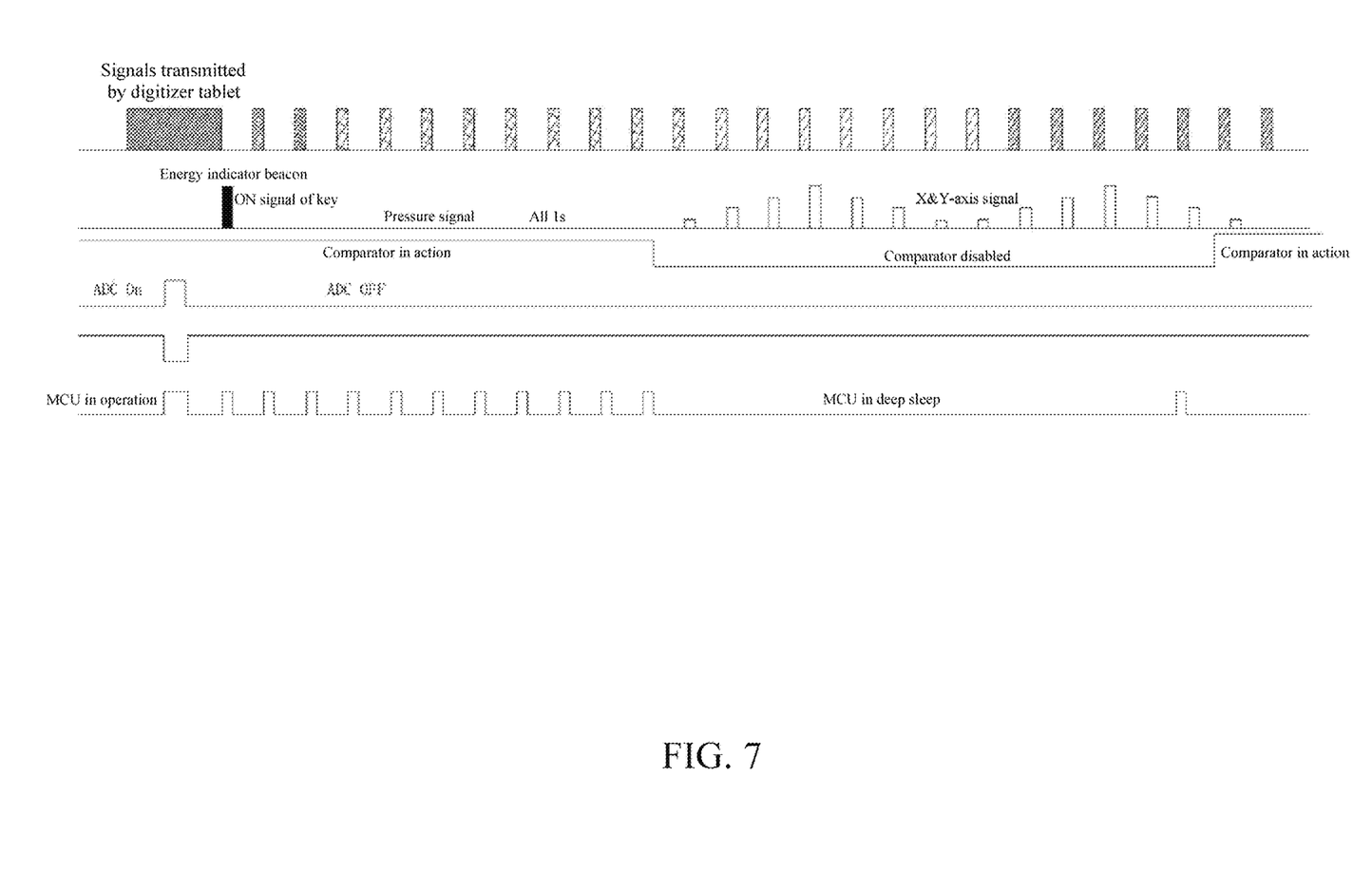

Referring to FIG. 7, a schematic diagram of signal transmission when the digital electromagnetic stylus is in contact with the digitizer tablet and the key switch is ON is illustrated. In this case, since the electromagnetic stylus is close to the detection range of the digitizer tablet and the power consumption is high, the system-on-chip unit 1 is in a sleep state except reading the stylus tip pressure data and the key state, transferring pressure signals, and synchronizing signals.

In Step06, the digitizer tablet parses and restores the received resonance signal based on an energy indicator beacon to acquire the touch information of the digital electromagnetic stylus, wherein the energy indicator beacon indicates a signal strength received by the transceiver unit.

When the transmission control unit 6 is disabled, the signal strength received by the transceiver unit 2 is used as an energy indicator beacon, the transceiver unit 2 transmits the energy indicator beacon to the digitizer tablet, and the digitizer tablet receives the energy indicator beacon and parses and restores the received resonance signal by using the energy indicator beacon as an energy reference. Since the digitizer tablet always uses the energy indicator beacon as the energy reference, the signal parsing is not affected by an operating height of the electromagnetic stylus, and thus the signal parsing is more accurate.

Figure 8:
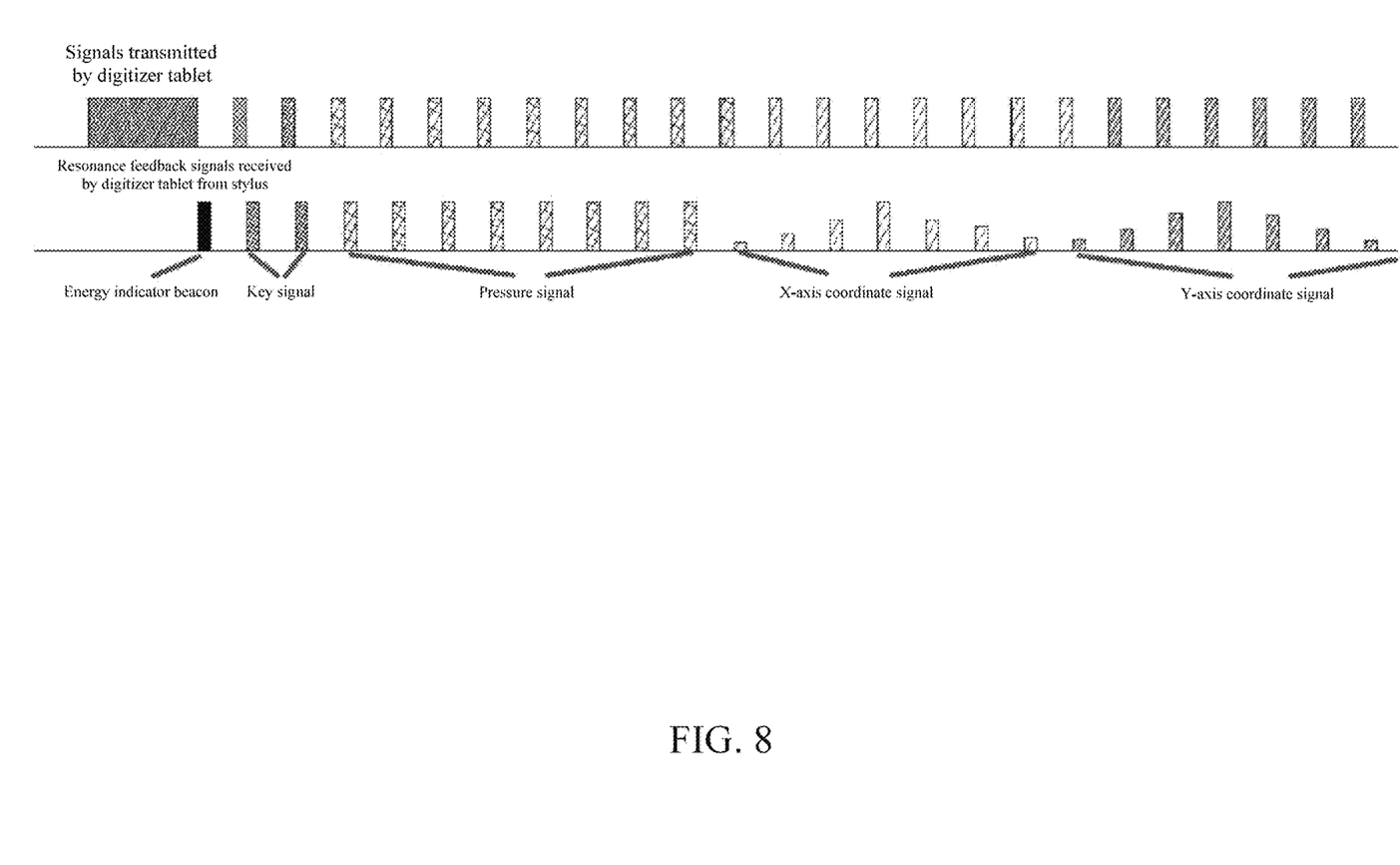
FIG. 8 is a schematic diagram of amplitude modulation between the digital electromagnetic stylus and the digitizer tablet.

Referring to FIG. 8, a schematic diagram of amplitude modulation between the digital electromagnetic stylus and the digitizer tablet is illustrated. The digitizer tablet transmits and receives signals as follows:

The digitizer tablet transmits a fixed-frequency electromagnetic signal with a first predetermined time length. The first predetermined time length is generally greater than 500 µs. Signal synchronization is performed within the first 256 µs, and pressure capture, key state reading, and preparation of data return are performed within the second 256 µs.

The digitizer tablet receives the energy indicator beacon.

The digitizer tablet transmits a fixed-frequency electromagnetic signal with a second predetermined time length, wherein the second predetermined time length is generally less than 256 µs.

The digitizer tablet receives bit0 and bit1 energy of the pressure, and restores the pressure signal based on the energy indicator beacon.

The digitizer tablet repeats steps C and D, until the pressure signal is completely detected.

The digitizer tablet transmits a fixed-frequency electromagnetic signal with a second predetermined time length, wherein the second predetermined time length is generally less than 256 µs.

The digitizer tablet receives the energy.

The digitizer tablet repeats steps F and G, until an X-axis coordinate signal and a Y-axis coordinate signal are completely detected.

It is assumed that the energy intensity of the energy indicator beacon is 1, the signal energy intensity ¾-1 represents 00 (0), the signal energy intensity ½-¾ represents 01 (1), the signal energy intensity ¼-½ represents 10 (2), the signal energy intensity 0-¼ represents 11 (3). As listed in Table 1, 16-bit data is represented by 8 transmission and reception combinations.

TABLE 1

| Received signal energy intensity | Digit representation | Decimal representation |
|---|---|---|
| 3/4-1 | 00 | 0 |
| 1/2-3/4 | 01 | 1 |
| 1/4-1/2 | 10 | 2 |
| 0-1/4 | 11 | 3 |

As compared with the related art, the digital electromagnetic stylus according to the present disclosure achieves the following beneficial effects:

1. Use of the system-on-chip achieves high flexibility.

2. When the detected pressure is zero or the significant bits are all zeros, the comparator may be disabled and only the time counter is used, and power consumption is reduced by changing the timing of the time counter.

3. Multiple-bit data is transmitted and received within a time period, and thus the transmission and reception is quicker and power is saved.

4. By using the ADC converter, pressure is read within a shorter time, which is not dependent on the transmission frequency of the digitizer tablet, and thus the circuit is simpler.

5. Since the digitizer tablet always uses the energy indicator beacon as the energy reference, the signal parsing is not affected by an operating height of the electromagnetic stylus, and thus the signal parsing is more accurate.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A digital electromagnetic stylus, comprising a system-on-chip unit, a transmission control unit and a transceiver unit that are connected in sequence, a first rectifier and filter unit and a second rectifier and filter unit that are connected in parallel between the system-on-chip unit and the transceiver unit, and a pressure and key detection unit connected to the system-on-chip unit; wherein the transceiver unit is configured to receive an electromagnetic signal transmitted by a digitizer tablet, and convert the electromagnetic signal into a corresponding electrical signal and output the electrical signal to the first rectifier and filter unit and the second rectifier and filter unit; and generate a resonance in response to a frequency of the electromagnetic signal approaching a resonance frequency thereof, and transmit a resonance signal to the digitizer tablet, such that the digitizer tablet acquires touch information of the electromagnetic stylus;

the first rectifier and filter unit is configured to shape and filter the electrical signal output by the transceiver unit, and output the shaped and filtered electrical signal to the system-on-chip unit to supply power to the system-on-chip unit;

the second rectifier and filter unit is configured to shape and filter the electrical signal output by the transceiver unit, and output the shaped and filtered electrical signal to the system-on-chip unit to wake up the system-on-chip unit;

the pressure and key detection unit is configured to detect stylus tip pressure data and a key state of the digital electromagnetic stylus; and the system-on-chip unit is configured to control, based on a detection result of the pressure and key detection unit, a time length within which the transmission control unit is disabled, and hence control an energy intensity of the resonance signal transmitted by the transceiver unit to the digitizer tablet.

2. The digital electromagnetic stylus according to claim 1, wherein the system-on-chip unit comprises an ADC converter, a comparator, a time counter, and a controller; wherein in response to the system-on-chip unit receiving the power and being initialized to enter deep sleep, the comparator is configured to generate a comparison output by comparing a voltage output by the second rectifier and filter unit with a predetermined comparison voltage, and generate an interrupt signal on a rising edge of the comparison output, wherein the interrupt signal wakes up the system-on-chip unit and the time counter is reset to zero; the ADC converter is configured to read the stylus tip pressure data and the key state detected by the pressure and key detection unit; the controller is configured to control, based on the stylus tip pressure data and the key state, the time length within which the transmission control unit is disabled, and hence control the energy intensity of the resonance signal transmitted by the transceiver unit to the digitizer tablet.

3. The digital electromagnetic stylus according to claim 1, wherein the transceiver unit comprises an inductor and a capacitor that are connected in parallel.

4. The digital electromagnetic stylus according to claim 1, wherein the transmission control unit comprises a field-effect transistor and a diode; wherein a source of the field-effect transistor is connected to an input terminal of the pressure and key detection unit and one terminal of the transceiver unit, a drain of the field-effect transistor is connected to a cathode of the diode, a gate of the field-effect transistor is connected to the system-on-chip, and an anode of the diode is connected to the other terminal of the transceiver unit.

5. An input system, comprising a digital electromagnetic stylus and a digitizer tablet; wherein the digital electromagnetic stylus comprises a system-on-chip unit, a transmission control unit and a transceiver unit that are connected in sequence, a first rectifier and filter unit and a second rectifier and filter unit that are connected in parallel between the system-on-chip unit and the transceiver unit, and a pressure and key detection unit connected to the system-on-chip unit; wherein the transceiver unit is configured to receive an electromagnetic signal transmitted by a digitizer tablet, and convert the electromagnetic signal into a corresponding electrical signal and output the electrical signal to the first rectifier and filter unit and the second rectifier and filter unit; and generate a resonance in response to a frequency of the electromagnetic signal approaching a resonance frequency thereof, and transmit a resonance signal to the digitizer tablet, such that the digitizer tablet acquires touch information of the electromagnetic stylus;

the first rectifier and filter unit is configured to shape and filter the electrical signal output by the transceiver unit, and output the shaped and filtered electrical signal to the system-on-chip unit to supply power to the system-on-chip unit;

the second rectifier and filter unit is configured to shape and filter the electrical signal output by the transceiver unit, and output the shaped and filtered electrical signal to the system-on-chip unit to wake up the system-on-chip unit;

the pressure and key detection unit is configured to detect stylus tip pressure data and a key state of the digital electromagnetic stylus; and the system-on-chip unit is configured to control, based on a detection result of the pressure and key detection unit, a time length within which the transmission control unit is disabled, and hence control an energy intensity of the resonance signal transmitted by the transceiver unit to the digitizer tablet; and the digitizer tablet is configured to acquire the touch information of the digital electromagnetic stylus based on the resonance signal.

6. The input system according to claim 5, wherein the system-on-chip unit comprises an ADC converter, a comparator, a time counter, and a controller; wherein in response to the system-on-chip unit receiving the power and being initialized to enter deep sleep, the comparator is configured to generate a comparison output by comparing a voltage output by the second rectifier and filter unit with a predetermined comparison voltage, and generate an interrupt signal on a rising edge of the comparison output, wherein the interrupt signal wakes up the ADC converter and the controller and the time counter is reset to zero; the ADC converter is configured to read the stylus tip pressure data and the key state detected by the pressure and key detection unit; the controller is configured to control, based on the stylus tip pressure data and the key state, the time length within which the transmission control unit is disabled, and hence control the energy intensity of the resonance signal transmitted by the transceiver unit to the digitizer tablet.

7. The input system according to claim 5, wherein the transmission control unit comprises a field-effect transistor and a diode; wherein a source of the field-effect transistor is connected to an input terminal of the pressure and key detection unit and one terminal of the transceiver unit, a drain of the field-effect transistor is connected to a cathode of the diode, a gate of the field-effect transistor is connected to the system-on-chip, and an anode of the diode is connected to the other terminal of the transceiver unit.

8. A method for controlling the input system as defined in claim 5, the method comprising:

Step01, transmitting, by the digitizer tablet, a fixed-frequency electromagnetic signal with a predetermined time length;

Step02, in response to the digital electromagnetic stylus being within a detection range of the digitizer tablet, receiving, by the transceiver unit, the electromagnetic signal transmitted by the digitizer tablet, and converting the electromagnetic signal into a corresponding electrical signal and outputting the electrical signal to the first rectifier and filter unit and the second rectifier and filter unit; and generating a resonance in response to a frequency of the electromagnetic signal approaching a resonance frequency thereof, and transmitting a resonance signal to the digitizer tablet;

Step03, shaping and filtering, by the first rectifier and filter unit, the electrical signal output by the transceiver unit, and outputting the shaped and filtered electrical signal to the system-on-chip unit; and in response to the system-on-chip unit receiving the power and being initialized to enter deep sleep, shaping and filtering, by the second rectifier and filter unit, the electrical signal output by the transceiver unit, and outputting the shaped and filtered electrical signal to the system-on-chip unit;

Step04, generating, by the system-on-chip unit, a comparison output by comparing a voltage output by the second rectifier and filter unit with a predetermined comparison voltage, and determining whether to wake up the system-on-chip unit based on the comparison output; wherein in response to the system-on-chip unit being waken up, Step05 is performed, and otherwise, the system-on-chip unit returns to a main program to enter deep sleep;

Step05, detecting, by the pressure and key detection unit, stylus tip pressure data and a key state of the digital electromagnetic stylus, and controlling, by the system-on-chip unit based on a detection result of the pressure and key detection unit, a time length within which the transmission control unit is disabled, and hence controlling an energy intensity of the resonance signal transmitted by the transceiver unit to the digitizer tablet; and Step06, parsing and restoring, by the digitizer tablet, the received resonance signal based on an energy indicator beacon to acquire the touch information of the digital electromagnetic stylus, wherein the energy indicator beacon indicates a signal strength received by the transceiver unit when the transceiver unit is disabled; and repeating Step02 to Step06 until the digital electromagnetic stylus leaves the detection range of the digitizer tablet.

9. The method according to claim 8, wherein the system-on-chip unit comprises an ADC converter, a comparator, a time counter, and a controller; wherein in response to the system-on-chip being initialized to enter deep sleep, the time counter starts timing;

the comparator generates a comparison output by comparing a voltage output by the second rectifier and filter unit with a predetermined comparison voltage, and generates an interrupt signal on a rising edge of the comparison output, wherein the interrupt signal wakes up the ADC converter and the controller and the time counter is reset to zero; the ADC converter reads the stylus tip pressure data and the key state detected by the pressure and key detection unit; the controller controls, based on the stylus tip pressure data and the key state, the time length within which the transmission control unit is disabled, and hence controls the energy intensity of the resonance signal transmitted by the transceiver unit to the digitizer tablet; and in response to no interrupt signal being generated within a predetermined time period, the time counter overflows and generates an interrupt; in response to the comparator being disabled at this time, the time counter is reset to zero and the comparator is enabled and returns to the main program to enter deep sleep; and in response to the comparator being enabled at this time, the ADC converter reads the stylus tip pressure data and the key state detected by the pressure and key detection unit, and returns to the main program to enter deep sleep.

10. The method according to claim 9, wherein in Step04, controlling, by the system-on-chip unit based on the detection result of the pressure and key detection unit, the time length within which the transmission control unit is disabled comprises:
- in response to a key switch not being pressed down and the stylus tip suffering no pressure, disabling the transmission control unit; and
- in response to detecting that the key switch is pressed down, enabling the transmission control unit; in response to detecting that a pressure value is 0, disabling the transmission control unit within a time period where the pressure value is 0; and in response to detecting that the pressure value is not 0, disabling or enabling the transmission control unit based on the pressure value within a time period where the pressure value is not 0, and controlling an enable time length according to a predetermined energy code.

* * * * *